United States Patent [19]

Courtney-Pratt et al.

[11] Patent Number: 4,763,978
[45] Date of Patent: Aug. 16, 1988

[54] OPTICAL FIBER CONNECTOR

[75] Inventors: Jeofry S. Courtney-Pratt, Locust; James R. McEowen, Holmdel, both of N.J.

[73] Assignees: American Telephone and Telegraph Company; AT&T Information Systems Inc., both of Murray Hill, N.J.

[21] Appl. No.: 915,263

[22] Filed: Oct. 3, 1986

[51] Int. Cl.[4] .......................... G02B 6/28; G02B 7/26
[52] U.S. Cl. ................................ 350/96.18; 350/96.15
[58] Field of Search ............... 350/96.15, 96.16, 96.17, 350/96.18

[56] References Cited

U.S. PATENT DOCUMENTS

| | | | |
|---|---|---|---|
| 3,883,223 | 5/1975 | Hudson | 350/96.16 |
| 4,145,110 | 3/1979 | Szentesi | 350/96.15 |
| 4,155,624 | 5/1979 | Logan et al. | 350/96.21 |
| 4,291,941 | 9/1981 | Melzer | 350/96.18 |
| 4,329,017 | 5/1982 | Kapany et al. | 350/96.18 X |
| 4,365,864 | 12/1982 | Cowley et al. | 350/96.16 |
| 4,405,200 | 9/1983 | Hoffmann et al. | 350/96.21 |
| 4,465,333 | 8/1984 | Caserta et al. | 350/96.20 |
| 4,479,697 | 10/1984 | Kapany et al. | 350/96.18 |
| 4,484,793 | 11/1984 | Laude | 350/96.18 X |
| 4,486,071 | 12/1984 | Levinson | 350/96.18 |
| 4,487,474 | 12/1984 | Nishie et al. | 350/96.21 |
| 4,493,529 | 1/1985 | Doty | 350/96.20 |
| 4,591,237 | 5/1986 | Laude | 350/96.16 X |
| 4,651,315 | 3/1987 | Laude | 350/96.18 X |
| 4,675,860 | 6/1987 | Laude et al. | 350/96.18 X |
| 4,684,208 | 8/1987 | Ishikawa et al. | 350/96.16 X |

OTHER PUBLICATIONS

Bowen, Terry, "Low Cost Connectors for Single Optical Fibers," Electronic Packaging and Production, pp. 140-144, 146 and 147, Sep. 1981.

Primary Examiner—Stanley D. Miller
Assistant Examiner—David R. Bertelson
Attorney, Agent, or Firm—Frederick B. Luludis

[57] ABSTRACT

The optical fiber connector of the present invention comprises a plurality of spaced-apart optical fiber receiving holes (or tubes) formed at one end of the connector and a spherical mirror formed at another end of the connector. The receiving holes are disposed on respective sides of the principal axis of the spherical mirror and the bottoms of the holes are collinear with and equidistant from the center of curvature of the mirror. Light signals emitted by an optical fiber inserted in one of the holes impinge on the mirror and are reflected in the direction of an optical fiber inserted in another one of the holes. The connector may be readily adapted to optically connect N+1 fibers together.

9 Claims, 5 Drawing Sheets

OPTICAL FIBER CONNECTOR

FIELD OF THE INVENTION

The invention relates to an optical fiber connector.

BACKGROUND OF THE INVENTION

Known optical fiber connectors typically comprise a multiplicity of individual parts, at least two of which must be machined to very close tolerances. These arrangements are, therefore, relatively expensive to manufacture. Moreover, the complexity and cost of such connectors increase substantially when they are adapted to connect more than two optical fibers together.

SUMMARY OF THE INVENTION

We have devised an optical fiber connector that is simple and inexpensive to manufacture. Moreover, unlike known optical fiber connectors, the cost and complexity of our connector does not increase substantially when it is adapted to connect more than two fibers together. Specifically, in accordance with one embodiment of our invention, a spherical mirror is formed at one end of a body of transparent material. Holes formed in the body of the material receive optical fibers such that an optical signal emitted by a fiber in one of the holes impinges on the spherical mirror where it is reflected to a fiber inserted in the other hole, thereby establishing a connection between the fibers.

In accordance with another embodiment of our invention, N segments of respective spherical mirrors are formed at one end of the connector allowing at least N+1 fibers to be connected together, the N+1 fibers being inserted in respective holes formed in the connector. In accordance with another aspect of the invention, the segments may be of unequal size, thereby providing a way of distributing different amounts of light to different receiving fibers.

DETAILED DESCRIPTION

Figure 1:
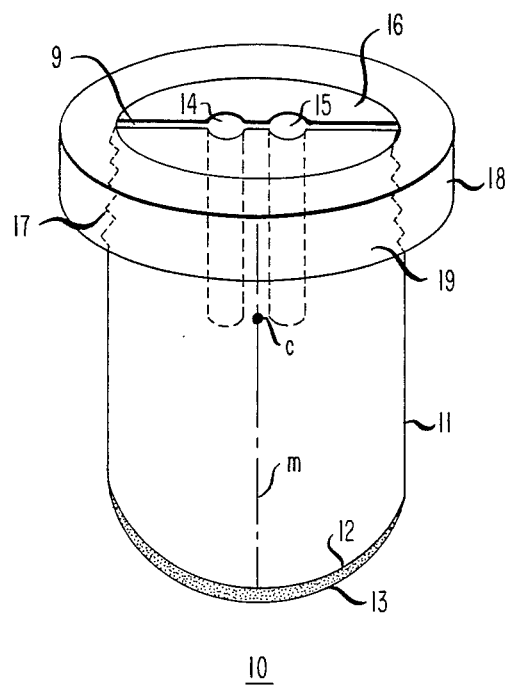
FIG. 1 illustrates an optical fiber connector embodying the invention.

Turning now to FIG. 1, there is shown an illustrative embodiment of a connector embodying the principles of the present invention. Specifically, connector 10 is formed from a body of transparent material, for example, LUCITE (or polymethyl methacrylate) available from E. I. DuPont de Nemours & Company, such that a spherical surface 12 is formed at one end of connector 10. The interior of spherical surface 12 serves as a mirror having a radius of curvature of illustratively 5 millimeters. The exterior of spherical surface 12 is coated with a reflective material 13, for example, aluminum, silver or gold, to reflect optical signals impinging thereon, the optical signals being emitted by optical fibers (not shown) inserted in holes, or holes, 14 and 15, respectively. (Spherical surface 12 and reflective material 13 are hereinafter collectively referred to as spherical mirror 12.)

Cylindrical shaped optical fiber receiving holes 14 and 15 are formed in the body 11 of connector 10 such that the bottoms of the holes are in line with the center of curvature C of spherical mirror 12. The centers of holes 14 and 15 are disposed equally distant from the line m passing through the principal axis of spherical mirror 12 and are placed on opposite sides of the line. Illustratively, holes 14 and 15 are each 1 centimeter deep and the centers thereof are each disposed 250 microns from line m. The depth of holes 14 and 15 and thus the length of connector 10 from C to end 16 does not affect the operation of connector 10 as long as the bottoms of the holes are in line with the center of curvature C of spherical mirror 12.

It is to be understood by the art that the dimensions of holes 14 and 15 may be formed to accommodate a particular gauge of optical fiber. Accordingly, it is an aspect of the invention to provide a family of connectors 10, each being adapted to receive a particular gauge of optical fiber. It is also an aspect of the invention to arrange connector 10 to accept two different gauges of optical fiber, e.g., a connector in which the diameter of hole 14 is adapted to accept one particular gauge of optical fiber and in which the diameter of hole 15 is adapted to accept another gauge of optical fiber.

In order to hold optical fibers in place once they have been inserted in holes 14 and 15, the end 16 of connector 10, in accordance with another aspect of the invention, is split along the center thereof, forming a gap 9. Also, an upper portion 19 of the body 11 of connector 10 is tapered and threaded, as shown. When threaded collar 18 is threaded onto tapered threads 17, the gap 9 closes, thereby causing connector 10 to grip the fibers and hold them securely in place. It is to be understood by the art that optical fibers could be, for example, cemented in place once they have been inserted in holes 14 and 15, respectively, as an alternative to providing split end 16, tapered threads 17 and nut 18. Other means of clamping or securing the fibers in holes 14 and 15 could also be provided.

Figure 2:
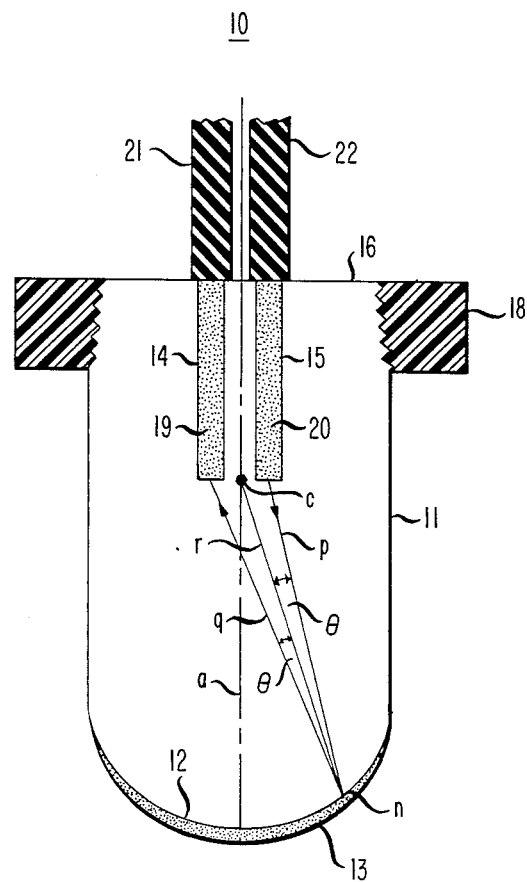
FIG. 2 illustrates a cross-sectional view of the connector of FIG. 1.

Turning now to FIG. 2, there is shown a cross-section of connector 10 with optical fibers 19 and 20 inserted into holes 14 and 15, respectively. The ends of optical fibers 19 and 20 are prepared in the conventional manner prior to inserting them into holes 14 and 15, respectively, i.e., the end of protective coverings 21 and 22 is removed from the fibers and the fibers are cut to the length (depth) of holes 14 and 15 using the well-known score-and-break technique. (It is noted that if desired the protective coatings may be left in place provided that the diameters of the holes in the connector are sufficiently large to accommodate the fibers and their protective coverings.) The end surfaces of the fibers may be lapped and polished if desired.

(It is noted that the optical interface between the fibers 19 and 20 and the bottoms of holes 14 and 15, respectively, may be improved by, for example, polishing the bottoms of holes 14 and 15 or by adding an index matching fluid, for example, a silicone gel, to holes 14 and 15.)

Connector 10 establishes, in accordance with the invention, an optical connection between the fibers 19 and 20 once the latter have been inserted in holes 14 and 15, respectively, as shown. Specifically, an optical signal emitted by a small source, such as fiber 20, spreads out in the form of a conical beam. One such ray p of the beam is shown in FIG. 2. As shown, ray p impinges on mirror 12 at a particular angle of incidence and is reflected at a particular angle of reflection, the reflected ray being designated q. The angle of incidence may be determined by extending a line r from the center of curvature C of mirror 12 to the point n at which ray p strikes mirror 12, the length of line r being the radius of curvature of mirror 12 and being perpendicular to mirror 12 at point n. The angle of incidence is then the angle $\theta$ between the path of ray p and the radius of curvature r. Since, according to Snells' law, the angle of incidence equals the angle of reflection, ray q is reflected at an angle $\theta$. It is well known that since the angle of reflection of ray q equals the angle of incidence of ray p, ray q is reflected in a direction that mirrors but is opposite to the direction of ray p. Accordingly, ray q impinges on fiber 19, thereby establishing, in accordance with the invention, an optical connection between fibers 19 and 21.

The foregoing discussion may also be applied to the remaining light rays of the cone of light emitted by fiber 20 to show that mirror 12 reflects virtually all of the rays into fiber 19. Moreover, the same reasoning can be applied to the converse case to show that mirror 12 reflects virtually all of the light rays emitted by fiber 19 into fiber 20.

Figure 3:
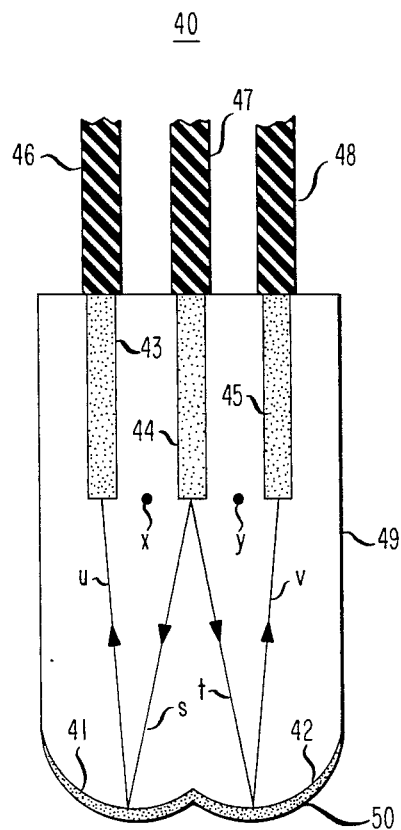
FIG. 3 illustrates a cross-sectional view of a second embodiment of the invention adapted to connect three optical fibers together.

Turning now to FIG. 3, there is shown a cross-section of a second embodiment of the invention that is arranged to connect three optical fibers 46, 47 and 48 together. As mentioned above, the optical fibers may be cemented in place once they have been inserted into respective ones of holes 43 through 45, which is the case in FIG. 3 and the following FIG. 4 discussed below. In particular, connector 40 is illustratively molded from a transparent material, for example, the aforementioned polymethyl methacrylate, such that two spherical segments 41 and 42 are formed at one end of connector 40, as shown. The center of curvature of spherical segment 41 and the center of curvature of spherical segment 42 are represented by points x and y, respectively. The exteriors of spherical segments 41 and 42 are coated with the aforementioned reflective material (designated 50 in FIG. 3) so that the segments act as spherical mirrors.

Holes 43, 44 and 45 are formed in the body 49 of connector 40 to a depth which is in line with points x and y. The center of hole 44 is positioned at the midpoint between points x and y and hole 43 (45) is the same distance from point x (y) as is hole 44. Thus, based on the foregoing, optical signals, such as light rays, emitted by fiber 47 from hole 44 impinge on both segments 41 and 42, as represented by rays s and t, respectively. The light rays s and t impinging on segments 41 and 42, respectively, are reflected by the reflective material 50 (the reflected rays being designated u and v, respectively) in the direction of holes 43 and 45 where the rays are received by the fibers 46 and 48, respectively.

Optical signals emitted by fiber 46 (48) from hole 43 (45), on the other hand, impinge on spherical segment 41 (42) and therefore are reflected in the direction of hole 44. Thus, in the present illustrative embodiment of the invention, fibers 46 and 48 are virtually decoupled from each other.

It is noted that one of the segments, say segment 41, could be smaller than the other segment. In that case, the level, or strength, of the optical signal received by fiber 46 would be less than the strength of the signal received by fiber 48. In fact, the invention of FIG. 3 may be arranged such that only a small portion of the optical signal is directed to fiber 46, which signal could then be used to monitor the strength of the signal emitted by fiber 47.

Figure 4:
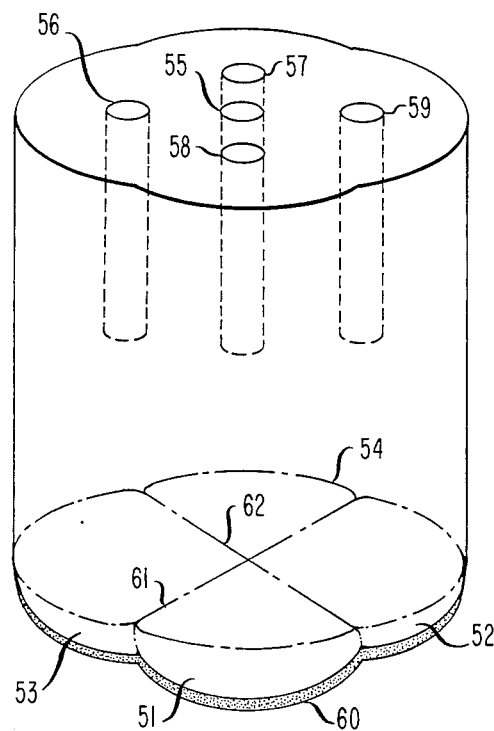
FIG. 4 illustrates a third embodiment of the invention, adapted to connect five optical fibers together.

Turning now to FIG. 4, there is shown a third embodiment of the invention adapted to connect illustratively five optical fibers together. In particular, four spherical segments 51 through 54 are formed at one end of connector 50 and the outer surfaces thereof are coated with the aforementioned reflective material (designated 60 in FIG. 5). (Dashed lines 61 and 62, which would not be seen in an actual embodiment of connector 50, highlight the fact that connector 50 comprises four segments.) Five holes 55 through 59 are formed in the body of connector 50 for receiving respective optical fibers (not shown). Hole 55 is disposed at the center of the connector and the center of curvature of each of segments 51 through 54 is equidistant from the center of hole 55 and the center of a respective one of holes 56 through 59.

Connector 50 operates similar to the way connector 40 of FIG. 3 operates. Specifically, optical signals emitted by a fiber inserted in the central hole—hole 55—impinge on segments 51 through 54. The reflective coating 60 on the outer surfaces of the segments reflects the signals impinging thereon in the direction of holes 56 through 59, respectively. Also, signals emitted by a fiber inserted in one of the holes 56 through 59 impinge on its respective one of spherical segments 51 through 54 where the reflective coating 60 reflects the signals in the direction of central hole 55.

Figure 5:
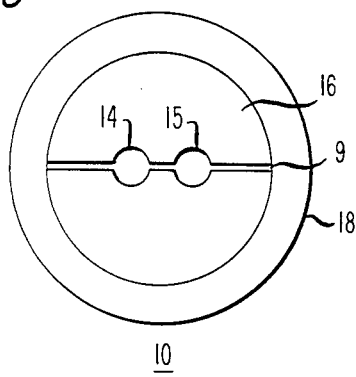
FIGS. 5, 6 and 7 show top views of the connectors illustrated in FIGS. 1, 3 and 4, respectively.
Figure 6:
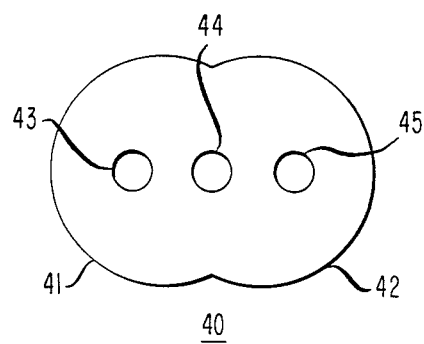
Figure 7:
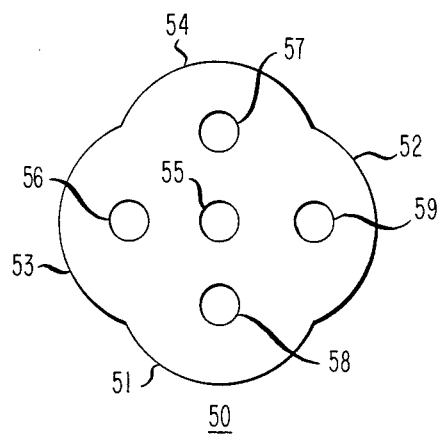

FIGS. 5, 6 and 7 illustrate top views of connectors 10, 40 and 50, respectively. It is to be understood by the art that the top portions of connectors 40 and 50 could be circular and split to a predetermined depth and have tapered threads for receiving a threaded collar as is shown for connector 10 in FIGS. 1 and 5.

The foregoing is merely illustrative of the principles of our invention. Those skilled in the art will be able to devise numerous arrangements which, although not explicitly shown or described herein, embody those principles and are within its spirit and scope. For example, the arrangement illustrated in FIG. 4 may be readily adapted to connect more than five fibers together.

What is claimed is:

1. A connector comprising
   a body of material having first and second ends, said first end being spherically shaped and coated with a reflective material to form a spherical mirror having a predetermined center of curvature, and
   first and second holes formed in said second end for receiving respective signal conductors, the interior ends of said holes being collinear with said center of curvature, said second end being split to form a gap of a predetermined depth and an exterior portion of said body of material at said second end being tapered and threaded,
   whereby when said signal conductors are inserted into respective ones of said first and second holes and a collar having interior threads is threaded onto said tapered threads said gap closes, thereby causing said split end to grip said conductors, and whereby light signals emitted by one of said signal conductors inserted in one of said holes impinge on said spherical mirror and are focused thereby to the other one of said signal conductors inserted in the other one of said holes.

2. The connector set forth in claim 1 wherein the interior ends of said first and second holes are disposed equal distances from the principal axis of said spherical mirror.

3. A connector comprising
  a body of material,
  a plurality of holes having respective predetermined depths formed at one end of said body of material, said one end being split to form a gap and the exterior portion of said body of material at said one end being tapered and threaded to receive a collar having interior threads, said collar when threaded onto said tapered threads causing said split end to grip signal conductors inserted in respective ones of said holes, and
  at least one curved surface coated with a reflective material formed at another end of said body of material, the shape of said at least one curved surface and the predetermined depths of the interior ends of said holes being such that light signals emitted by one of said signal conductors, impinge on said at least one curved surface and are reflected thereby to at least another one of said signal conductors.

4. The connector set forth in claim 3 wherein said at least one curved surface forms at least one spherical mirror at said other end of said body of material, the interior ends of said holes being collinear with the center of curvature of said at least one spherical mirror.

5. The connector set forth in claim 4 wherein the interior ends of said holes are disposed equal distances from the principal axis of said at least one spherical mirror.

6. A connector comprising
  a body of material having first and second ends, said first end having a plurality of segments of respective curved surfaces formed therein, the exterior of each of said segments being coated with a reflective material to form respective segments of spherical mirrors and at least one of said segments of spherical mirrors being smaller than at least one other one of said segments of spherical mirrors, and
  a plurality of holes formed in said second end of said material for receiving respective signal conductors, the interior ends of individual ones of said holes being collinear with the radius of curvature of respective ones of said segments of spherical mirrors such that optical signals emitted by a signal conductor inserted in one of said holes impinge on at least one of said segments and are reflected thereby toward at least another one of said signal conductors inserted in another one of said holes.

7. A connector comprising
  a plurality of holes for receiving respective optical conductors, and
  a plurality of segments of respective spherical mirrors for reflecting light signals emitted by one of said optical conductors toward at least another one of said optical conductors, at least one of said segments being smaller than at least another one of said segments.

8. The connector set forth in claim 7 wherein individual ones of said holes each have an interior end that is disposed a predetermined distance from the principal axis of its respective one of said segments of spherical mirrors.

9. The connector set forth in claim 7 wherein individual ones of said holes each have an interior end that is collinear with the center of curvature of its respective one of said segments of spherical mirrors.

* * * * *